(12) United States Patent
Ollivant et al.

(10) Patent No.: US 11,198,631 B2
(45) Date of Patent: Dec. 14, 2021

(54) MEMBRANE WASTEWATER TREATMENT OF COMBINED SEWER OVERFLOWS AND SANITARY SEWER OVERFLOWS

(71) Applicant: Ovivo Inc., Montreal (CA)

(72) Inventors: Mike Ollivant, Tacoma, WA (US); Peter J. Bugg, Caledonia, IL (US); Dennis Livingston, Austin, TX (US)

(73) Assignee: Ovivo Inc., Montreal (CA)

( * ) Notice: Subject to any disclaimer, the term of this patent is extended or adjusted under 35 U.S.C. 154(b) by 21 days.

(21) Appl. No.: 16/651,988

(22) PCT Filed: Sep. 28, 2018

(86) PCT No.: PCT/IB2018/001245
§ 371 (c)(1),
(2) Date: Mar. 27, 2020

(87) PCT Pub. No.: WO2019/064077
PCT Pub. Date: Apr. 4, 2019

(65) Prior Publication Data
US 2020/0270156 A1    Aug. 27, 2020

Related U.S. Application Data

(60) Provisional application No. 62/578,811, filed on Oct. 30, 2017, provisional application No. 62/566,200, filed on Sep. 29, 2017.

(51) Int. Cl.
*C02F 9/00* (2006.01)
*C02F 1/44* (2006.01)
(Continued)

(52) U.S. Cl.
CPC .............. *C02F 9/00* (2013.01); *B01D 61/16* (2013.01); *B01D 2311/2642* (2013.01);
(Continued)

(58) Field of Classification Search
CPC .......... C02F 9/00; C02F 1/444; C02F 1/5281; C02F 3/1236; C02F 2103/001;
(Continued)

(56) References Cited

U.S. PATENT DOCUMENTS 6,436,289 B1 *   8/2002   Johnstone ................. C02F 3/12
                                                   210/620
7,329,344 B2 *   2/2008   Jordan .................... B01D 65/08
                                                   210/195.1
(Continued)

FOREIGN PATENT DOCUMENTS

WO    WO95/11736 A1    5/1995
WO    WO2013102864     7/2013

OTHER PUBLICATIONS

Bendick, "Feasibility of Cross-Flow Microfiltration for Combined Sewer Overflows", University of Pittsburgh School of Engineering, Aug. 6, 2003, Thesis, pp. 1-123.

*Primary Examiner* — Joseph W Drodge
(74) *Attorney, Agent, or Firm* — Thomas M. Freiburger

(57) ABSTRACT

A wastewater treatment system includes a biological treatment plant and an auxiliary, non-biological treatment plant. The auxiliary plant receives overflow, which can be sanitary sewer overflow, combined sewer overflow or strictly storm overflow. Treatment is by coagulation and membrane separation, removing most bacteria. Following treatment the outflow can be discharged to streams.

22 Claims, 2 Drawing Sheets

(51) Int. Cl.
*C02F 3/12* (2006.01)
*B01D 61/16* (2006.01)
*C02F 1/52* (2006.01)
*C02F 103/00* (2006.01)

(52) U.S. Cl.
CPC ............ *C02F 1/444* (2013.01); *C02F 1/5281* (2013.01); *C02F 3/1236* (2013.01); *C02F 2103/001* (2013.01); *C02F 2303/04* (2013.01); *C02F 2303/24* (2013.01)

(58) Field of Classification Search
CPC .... C02F 2303/04; C02F 2303/24; C02F 1/44; C02F 1/52; C02F 3/00; C02F 3/006; C02F 3/06; Y02W 10/10; B01D 21/0024; B01D 21/01; B01D 21/24; B01D 21/245; B01D 21/30; B01D 21/34; B01D 61/14; B01D 61/145; B01D 61/18; B01D 61/20; B01D 2311/25; B01D 2311/26; B01D 2311/2642; B01D 2311/2688; B01D 61/04; B01D 61/16
See application file for complete search history.

(56) References Cited

U.S. PATENT DOCUMENTS

| | | | |
|---|---|---|---|
| 7,585,411 B2* | 9/2009 | Knappe | B01D 61/14 210/232 |
| 8,999,170 B2 | 4/2015 | Livingston | |
| 2005/0006305 A1* | 1/2005 | Juby | C02F 3/2846 210/603 |
| 2005/0236327 A1* | 10/2005 | Gordon | C02F 3/00 210/631 |
| 2006/0008865 A1* | 1/2006 | Cote | C02F 3/1273 435/34 |
| 2011/0000836 A1* | 1/2011 | Livingston | C02F 3/1273 210/151 |
| 2012/0018374 A1* | 1/2012 | Sun | C02F 3/308 210/605 |
| 2012/0255902 A1* | 10/2012 | Livingston | C02F 9/00 210/607 |
| 2015/0122709 A1* | 5/2015 | Sosa-Sanchez | C02F 11/04 210/85 |
| 2015/0210579 A1* | 7/2015 | Tanaka | C02F 3/1268 210/614 |
| 2015/0353397 A1* | 12/2015 | Cath | C02F 3/1263 210/195.1 |
| 2017/0050872 A1* | 2/2017 | Scroggins | C02F 1/66 |
| 2017/0121200 A1* | 5/2017 | Brozell | B01D 61/147 |

* cited by examiner

MEMBRANE WASTEWATER TREATMENT OF COMBINED SEWER OVERFLOWS AND SANITARY SEWER OVERFLOWS

This application claims priority from international application number PCT/IB2018/001245, filed Sep. 28, 2018, which claimed priority from provisional patent application Ser. Nos. 62/566,200, filed Sep. 29, 2017 and 62/578,811, filed Oct. 30, 2017.

BACKGROUND OF THE INVENTION

This invention concerns wastewater treatment and particularly the handling of overflow beyond capacity of sewerage or of a treatment plant, due to storm flow or other causes.

Combined sewer overflows (CSO) and sanitary sewer overflows (SSO) occur when wastewater infrastructure (e.g. sewerage) is unable to convey sewage and/or stormwater to a receiving wastewater treatment facility due to capacity limitations, or when the flow reaching a treatment plant is beyond plant capacity. A CSO or SSO in a wastewater conveyance system results in an overflow of untreated sewage directly or indirectly to the nearest water body. This can occur at many locations in a city or county or sewer district, far upstream from a treatment plant. Due to the complexity and cost associated with increasing infrastructure capacity, some municipalities and wastewater agencies have been unable to eliminate CSOs and SSOs to meet local, regional, and national regulatory requirements. Those municipalities and agencies that continue to have untreated CSOs and SSOs face regulatory actions and fines.

Some systems have been put in place to treat CSO and SSO overflows. Current treatment and disinfection systems may fail to achieve all regulatory requirements including adequate removal of wastewater contaminants, and adequate time for disinfection and removal of chemical disinfectants prior to discharge. CSO and SSO treatment requirements will vary dependent on the jurisdictional agency(s) and the receiving water body, and may include treatment and monitoring of contaminants which are not yet regulated, such as heavy metals.

The usual cause of these overflows is infiltration of groundwater into sewer lines or direct inflow of storm water into a separated or combined sewage system. A treatment system for CSO and SSO (should it exist) may sit idle for long periods of time and then need to be operational with little to no advance notice. Current systems used for CSO and SSO treatment may also require some "start up" time that can lead to untreated or partially untreated discharges until the system can become fully operational.

Current Technologies:

Many CSO/SSO facilities have at least some form of screening to capture large solids, for example those in excess of ½". Various forms of chemical/physical processes such as rapid sand filtration or ballasted floc systems have been used to capture small particles. Chlorination followed by dechlorination is commonly used for disinfection.

These systems have the following problems:
1. Need some advance start up time to work at peak design capacity and become fully operational.
2. Need adequate time for disinfection to be achieved.
3. Need adequate time to remove excess disinfectant.
4. Require large areas for the equipment.

See also Ovivo U.S. Pat. No. 8,999,170, describing a storm/peak overflow treatment system with several physical and chemical/biological treatment steps. Activated carbon treatment and zeolite treatment are required.

Another issue is "first flush stormwater". When substantial rain occurs after a period of dryness, the rainwater tends to flush out all accumulated contaminants from sewers and from streets and other outdoor surfaces. This first flush stormwater can be extremely toxic and can carry, for example, PCBs from transformers and other toxic contaminants, in concentrated quantities.

SUMMARY OF THE INVENTION

Membranes are currently used in water and wastewater processes for removal of wastewater constituents, suspended solids, heavy metals, bacteria, and other contaminants. Membranes have further been used for peak flow management (U.S. Pat. No. 8,999,170) combined with a wastewater treatment process. Membrane filtration has not been used for applications in CSO and SSO treatment as a standalone treatment system.

The system of this invention utilizes submerged membranes, in an open or closed tank(s), as filtration devices to receive and treat CSOs and SSOs prior to surface water discharge. The membranes can be the sole treatment for overflows, other than screening and use of a coagulant.

The advantages are (1) smaller footprint than current technologies; (2) controlled membrane pore size allowing removal of bacteria to achieve regulatory disinfection with limited or no additional disinfection process; (3) fast startup time for full operational capacity; and (4) greater removal of wastewater contaminants over current CSO and SSO treatment processes.

The system consists of a physical treatment process using submerged membranes, and a coagulant system as needed to maintain adequate flux rates. The CSO/SSO sewage enters the submerged membrane chamber, along with coagulants, after screening and prior to discharge into the receiving water body. This preferably is the sole treatment for reducing bacteria, other than possible addition of a resident disinfectant after membrane treatment, if required in some jurisdictions.

The system of the invention involves at least one and usually more overflow treatment facilities, which in some cases will be located far upstream of the main sewage treatment plant, at some or all locations where overflow tends to occur, typically carried away in prior municipal systems by an overflow pipe that can carry the raw wastewater to a nearby body of water. At each such location a small-footprint treatment facility is provided to receive the overflow, which can be the water flowing over a weir, for example. The overflow wastewater is screened, after which a coagulant is added and the wastewater enters one or more coagulation/flocculation tanks with submerged membranes. The membranes are of sufficiently small pore size to remove bacteria, and in a typical case disinfectants will not be needed.

DESCRIPTION OF PREFERRED EMBODIMENT

Figure 1:
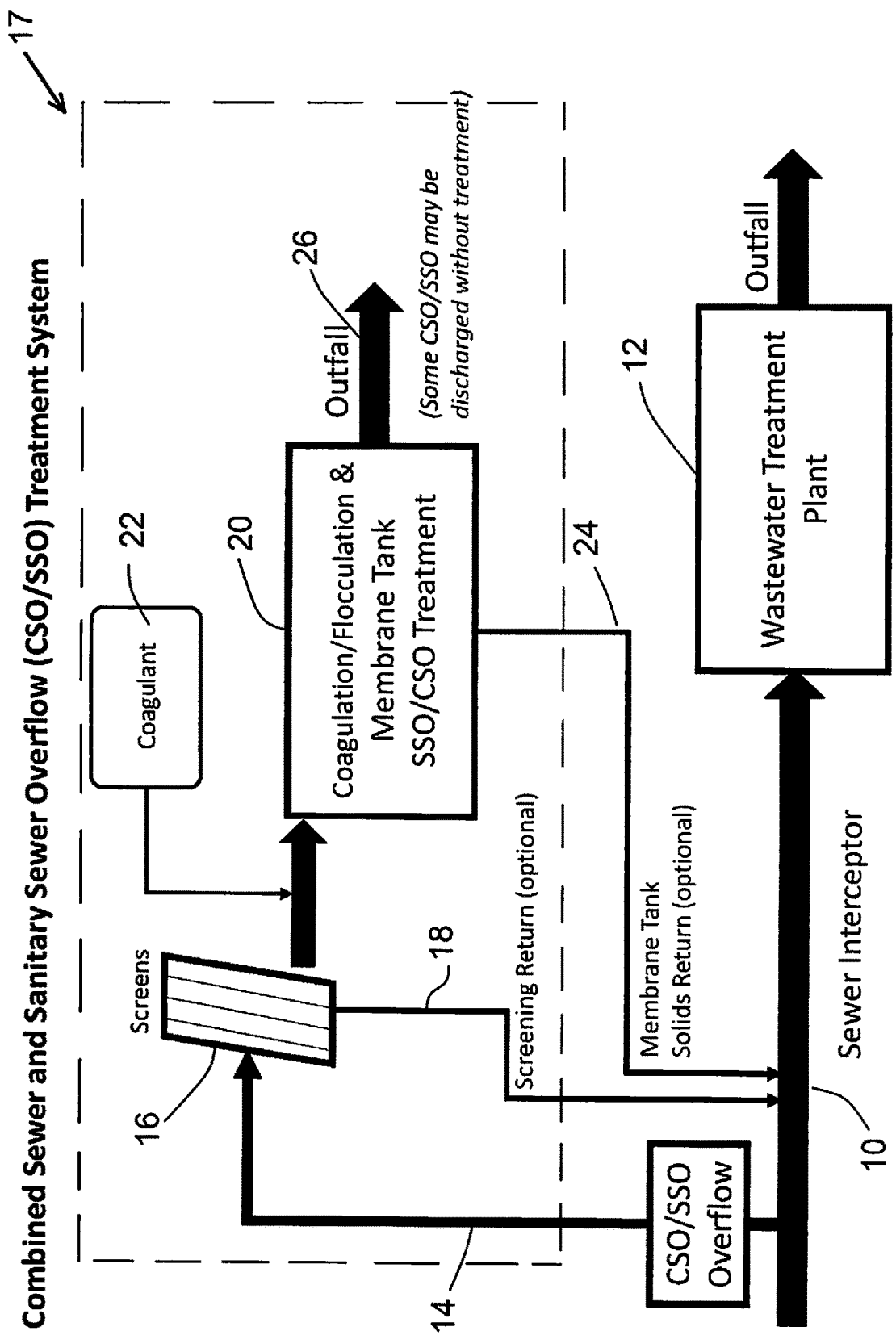
FIG. 1 shows an example of an overflow treatment system of the invention, basically in block diagram form.

In FIG. 1 a sewer line is shown at 10. This can be one of several large sewer lines carrying wastewater to a wastewater treatment plant indicated at 12, i.e. a biological treatment facility. In overflow conditions, such as storm flow or periods of excess water entering the system, with a CSO or SSO, overflow enters an overflow line 14, which is usually far upstream and remote from the plant 12. The overflow is screened for large particles, indicated at 16, at an overflow system or plant 17, which is a non-biological treatment facility. As the drawing shows, screened material can be returned to the main sewer interceptor line 10, via an optional return line 18. If no such line is available the screened material can be stored and removed by other means.

The screened wastewater is admitted to a coagulation/flocculation and membrane tank, basin or vessel 20, with coagulant added, as noted in the block 22 (the term tank is to include any such containment vessel, whether open or closed). The coagulant can be added to the tank 20 or upstream of the tank as indicated. Submerged membranes remove water from the wastewater, and solids remain in the tank until removed. Solids will be removed from the tank 20 via a solids return line 24 as shown, and can be treated in the wastewater treatment plant 12. If the overflow condition is due to storm flow, the solids return can occur during the overflow condition, or the solids can be delivered into the treatment plant after the event. If no such line 24 exists, solids can be stored and processed by other means.

As noted above, the pore size of the submerged membranes in the tank 20 is small enough to separate out bacteria. For example, the pore size can be in the range of about 0.1 to 0.5 micron.

Outfall of relatively clean water is shown at 26, for discharge to rivers, streams or lakes. The drawing indicates some CSO/SSO may be discharged without treatment, for jurisdictions where a certain proportion of the outfall can be untreated sewage.

Note that the overflow treatment system 17 can be effective to treat first flush stormwater. After a certain number of dry days followed by a rain event, the system can be set so that the plant 17 (or several such plants) receives all stormwater collected in area sewers for a short period of time, e.g. several hours or longer, sufficient to receive the toxic storm flush. The system 17 will greatly reduce toxic materials in the water. After such a period the overall system can return to the normal routine as described above, or if the system 17 is independent of any biological treatment system, the rain water can follow its normal path, bypassing the system 17.

Figure 2:
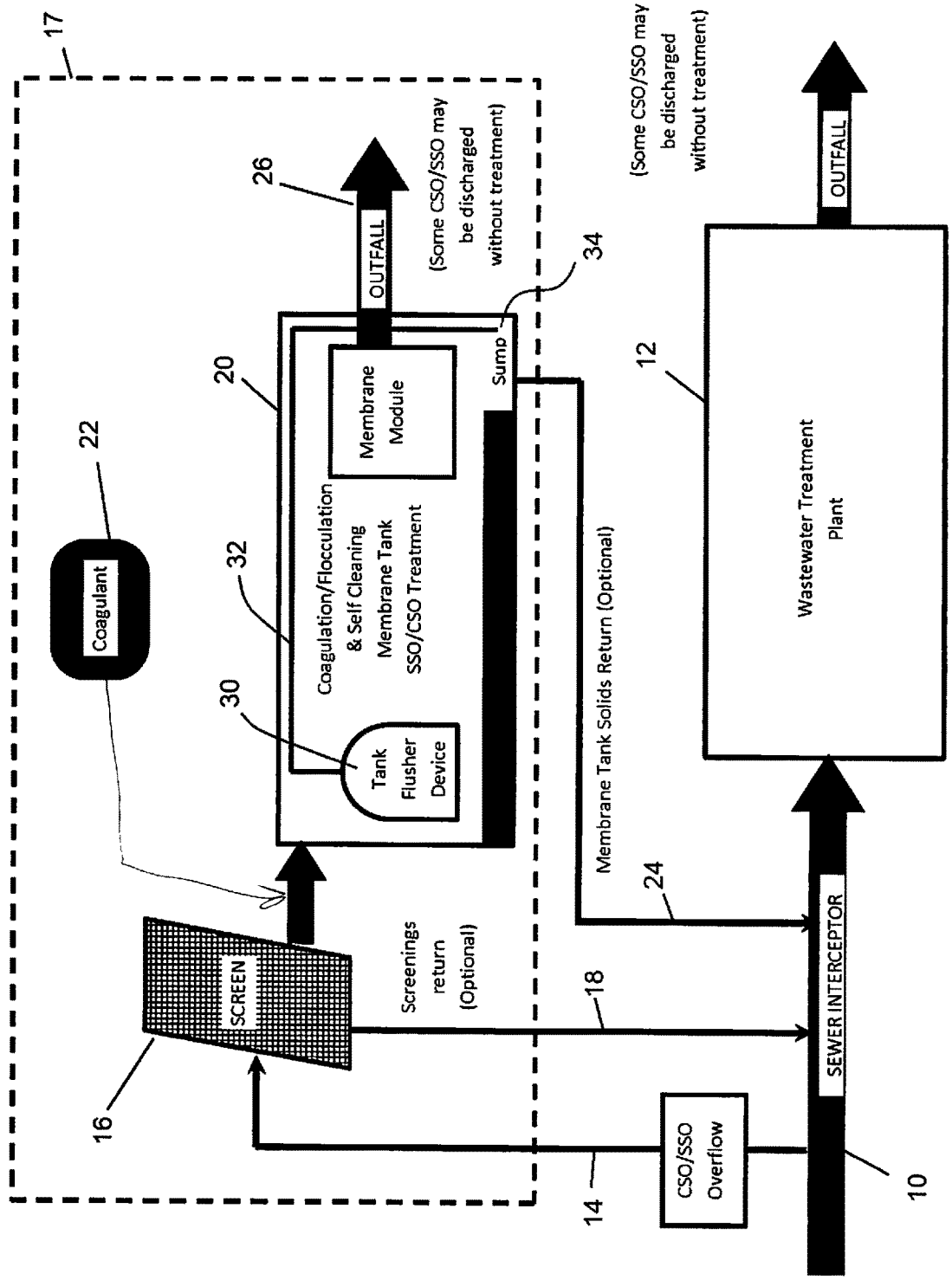
FIG. 2 is similar, but shows an optional tank flushing system in a membrane tank of the overflow treatment system.

The system in one preferred form, as shown in FIG. 2, includes an integral flushing device to clean the tank 20 following an overflow treatment event. This applies to an open membrane tank 20. Long periods can ensue between such events, and there can be a need for cleaning debris from the tank bottom. After a wet weather event, the tank 20 is drained, and an integral flushing device is used to rinse the tank clean. This could be done several ways, one being in accordance with OVIVO's CWF STORM FLUSH. In that flush system, which has not been used previously in a membrane tank, a storm event fills a tank with overflow water. Water enters a tank flusher device 30 from its open bottom, displacing air from the device 30 through a pipe 32, which bubbles air out through a pipe end 34 that is near the tank bottom. When the storm event ends, liquid drains out via the line 24, but the flusher device 30 retains water due to vacuum. When the water level in the tank falls below the end 34 of the vent pipe, this vents the flusher, which dumps its water quickly, flushing the membrane tank and washing out debris through the sump. Following this the tank can be rinsed with spray water, if desired.

The non-biological system of the invention treats overflow water, which usually will contain sanitary sewage, with coagulant and membrane filtration as the sole treatment, without requiring any other treatment (such as activated carbon or zeolite or other physical/biological steps), other than possible addition of a disinfectant to the membrane treated water if required in certain jurisdictions. Note that zeolite and activated carbon treatment are considered chemical/biological treatment steps, which are avoided in the invention.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A wastewater treatment system including biological treatment of sanitary sewage, the system including sewerage carrying wastewater to a biological treatment plant, and the system being subject to occasional overflows beyond capacity of the sewerage or of the biological treatment plant, comprising:

the biological treatment plant including a liquid side with biological treatment of an incoming stream of wastewater, upstream of the biological wastewater treatment plant, a diverter for overflow wastewater beyond capacity of the sewerage or of the biological wastewater treatment plant, the overflow wastewater containing biological nutrients, a screen positioned to screen the overflow wastewater, and at least one non-biological and non-chemical/biological overflow treatment plant, positioned to receive the overflow wastewater from the diverter during a period of an overflow, each non-biological overflow treatment plant including means for coagulating the screened overflow wastewater, and a membrane tank receiving the wastewater, the tank having submerged membranes through which coagulated wastewater is directed, the membranes being of a pore size sufficiently small to separate out and reduce bacteria, the non-biological overflow treatment plant being without activated carbon or zeolite treatment, whereby each non-biological overflow treatment plant produces a physically treated permeate outflow greatly reduced in bacteria and solids, without requiring activated carbon or zeolite treatment.

2. The wastewater system of claim 1, wherein each non-biological overflow treatment plant includes means for moving screened material from the screen and adding the screened material to the incoming stream of wastewater to the biological treatment plant.

3. The wastewater system of claim 1, including means for moving solids separated out from the overflow wastewater by the membranes to the incoming stream of wastewater to the biological treatment plant.

4. The wastewater system of claim 1, wherein the biological treatment plant is a solely sanitary sewage treatment plant.

5. The wastewater system of claim 1, wherein the biological treatment plant is a combined sewage treatment facility, receiving sanitary sewage as well as storm water.

6. The wastewater system of claim 1, wherein the pore size of the membranes in the at least one non-biological overflow treatment plant is in the range of about 0.1 to 0.5 microns.

7. The wastewater system of claim 1, wherein in each non-biological overflow treatment plant the pore size of the membranes is sufficiently small to remove essentially all bacteria.

8. The wastewater system of claim 1, wherein the screen is positioned upstream of the diverter.

9. The wastewater system of claim 1, wherein in each non-biological overflow treatment plant the means for coagulating comprises means for adding a coagulant to the screened wastewater upstream of the membrane tank, providing for coagulation to take place in the membrane tank.

10. The wastewater system of claim 1, wherein in each non-biological overflow treatment plant the membrane tank is an open tank and includes in the membrane tank a flusher device that fills with wastewater when the membrane tank receives wastewater during a period of an overflow, and releases a sudden flush of wastewater after the period of overflow, as the membrane tank drains, thus removing and draining debris from the tank.

11. The wastewater system of claim 1, further including at least one non-biological first flush stormwater treatment plant receiving first flush stormwater from sewers or runoff streams for a set period of time after onset of a rainfall, irrespective of any overflow event, for treatment of the first flush stormwater containing a concentration of toxic materials, the at least one non-biological first flush stormwater treatment plant each including means for coagulating the overflow wastewater, and a membrane tank receiving the wastewater, the tank having submerged membranes through which coagulated wastewater is directed, the membranes being of a pore size sufficiently small to separate out and reduce bacteria, the at least one non-biological first flush stormwater treatment plant each being without activated carbon or zeolite treatment.

12. The wastewater treatment system of claim 1, wherein the submerged membranes constitute a sole means of reducing bacteria in the screened overflow wastewater, without disinfectant or other post-treatment.

13. A facility comprising a non-biological wastewater treatment plant for treatment of overflow in a sewerage system or for treating first flush stormwater, comprising:
a diverter upstream of the non-biological treatment plant for diverting wastewater beyond capacity of the sewerage system or of a biological wastewater treatment plant, the non-biological wastewater treatment plant comprising:
a screen positioned downstream of the diverter to screen incoming wastewater which contains biological nutrients,
means for coagulating the screened wastewater downstream of the screen, and
a membrane tank receiving the screened and coagulated wastewater, the tank having submerged membranes through which the screened and coagulated wastewater is directed, the membranes being of a pore size sufficiently small to separate out and substantially eliminate bacteria, as a sole means of eliminating bacteria and nutrients in the screened and coagulated wastewater,
whereby the non-biological wastewater treatment plant produces a physically treated permeate outflow to meet overflow discharge requirements.

14. The non-biological wastewater treatment plant of claim 13, wherein the pore size of the membranes in the non-biological wastewater treatment plant is in the range of about 0.1 to 0.5 microns.

15. A wastewater treatment system including biological treatment of sanitary sewage, the system including sewerage carrying wastewater to a biological treatment plant, and the system being subject to occasional overflows beyond capacity of the sewerage or the biological treatment plant, comprising:
the biological treatment plant including a liquid side with biological treatment of an incoming stream of wastewater,
upstream of the biological wastewater treatment plant, a diverter for overflow wastewater beyond capacity of the sewerage or of the biological wastewater treatment plant, the overflow wastewater containing biological nutrients,
a screen positioned to screen the overflow wastewater,
at least one non-biological overflow treatment plant, positioned to receive the overflow wastewater from the diverter during a period of an overflow, each non-biological overflow treatment plant including means for coagulating the screened overflow wastewater, and a membrane tank receiving the wastewater, the tank having submerged membranes through which coagulated wastewater is directed to produce a permeate outflow, the membranes being of a pore size sufficiently small to separate out bacteria, the non-biological overflow treatment plant being without activated carbon or zeolite treatment, and
means for adding a disinfectant to the permeate outflow,
whereby each non-biological overflow treatment plant produces a physically treated and disinfected permeate outflow greatly reduced in bacteria and solids without requiring activated carbon or zeolite treatment.

16. The wastewater treatment system of claim 15, wherein the pore size of the membranes in each non-biological overflow treatment plant is in the range of about 0.1 to 0.5 microns.

17. A method for treating an overflow in a system of sewerage that includes a biological treatment plant, the overflow being beyond normal flow capacity of the biological treatment plant, comprising:
providing at least one non-biological overflow treatment plant, positioned in the sewerage system separate from the biological treatment plant, to receive overflow wastewater during a period of overflow,
during the period of overflow, screening the overflow wastewater upstream of the non-biological overflow treatment plant, the overflow wastewater containing biological nutrients,
in each non-biological overflow treatment plant, coagulating the screened overflow wastewater in the non-biological overflow treatment plant,
treating the coagulated overflow wastewater during the period of overflow in a membrane tank having submerged membranes through which the coagulated wastewater is directed, the membranes being of a pore size sufficiently small to separate out and reduce bacteria, without activated carbon or zeolite treatment, to produce a physically treated permeate outflow greatly reduced in bacteria and solids,
during the period of overflow, discharging the permeate outflow to a nearby body of water, and following the period of overflow, ceasing flow of overflow wastewater to the non-biological overflow treatment plant.

18. The method of claim 17, wherein at each non-biological overflow treatment plant the treatment of the wastewater in the membrane tank is a sole means of reducing biological nutrients and bacteria in the wastewater, without post-treatment.

19. The method of claim 17, wherein the pore size of the membranes in each non-biological overflow treatment plant is in the range of about 0.1 to 0.5 microns.

20. The method of claim 19, wherein the physically treated permeate outflow meets discharge requirements for overflow wastewater for a jurisdiction in which the at least one non-biological overflow treatment plant is located.

21. The method of claim 17, wherein in each non-biological overflow treatment plant the membrane tank is an open tank and includes in the membrane tank a flusher device that fills with wastewater when the membrane tank receives wastewater during a period of an overflow, and releases a sudden flush of wastewater after the period of overflow, as the membrane tank drains, thus removing and draining debris from the tank.

22. The method of claim 17, wherein said at least one non-biological overflow treatment plant comprises at least two said non-biological overflow treatment plants which are provided at locations remote from the biological treatment plant.

\* \* \* \* \*